(No Model.)
A. SKINNER.
PULVERIZER.
No. 317,227. Patented May 5, 1885.
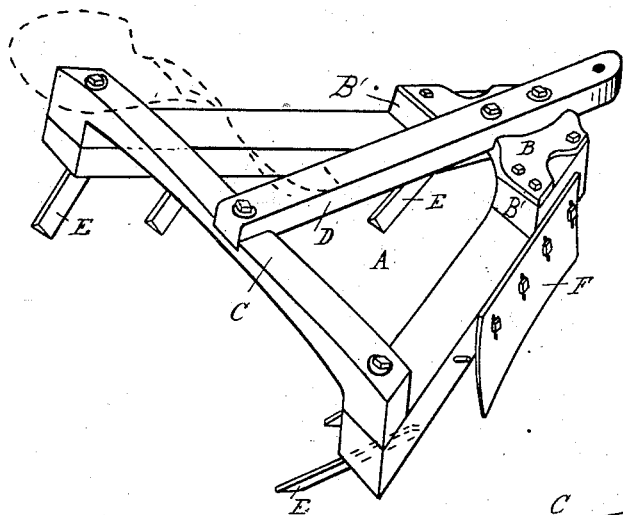
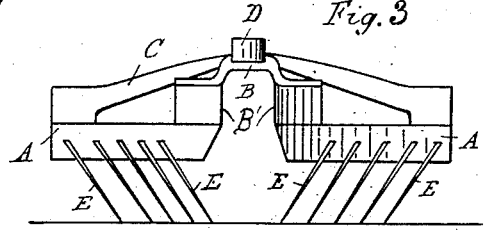
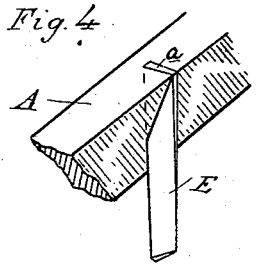
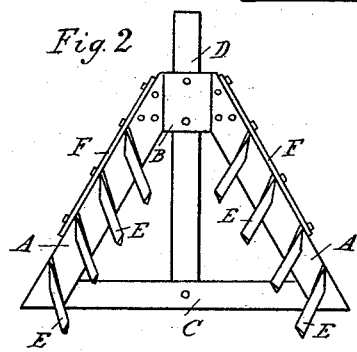
Attest
J. Paul Mayer
Inventor
Alonzo Skinner
By Thos. L. Sprague
Atty

UNITED STATES PATENT OFFICE.

ALONZO SKINNER, OF WARREN, MICHIGAN.

PULVERIZER.

SPECIFICATION forming part of Letters Patent No. 317,227, dated May 5, 1885.

Application filed May 15, 1884. (No model.)

*To all whom it may concern:*

Be it known that I, ALONZO SKINNER, of Warren, in the county of Macomb and State of Michigan, have invented new and useful Improvements in Pulverizers; and I do hereby declare that the following is a full, clear, and exact description thereof, reference being had to the accompanying drawings, which form a part of this specification.

This invention relates to certain new and useful improvements in the construction of that class of agricultural implements commonly designated "pulverizers;" and the invention consists in the peculiar construction, arrangement, and combination of the parts, all as more fully hereinafter set forth and claimed.

Figure 1 is a perspective view of my improved pulverizer. Fig. 2 is a bottom plan. Fig. 3 is a rear elevation, and Fig. 4 is a detail showing the manner of attaching the teeth to the frame.

In the accompanying drawings, which form a part of this specification, A represents the frame of my pulverizer, being in the general form of the so-called "A-frames." The forward ends of the bars of this frame are secured together by an arched girt, B. The rear and expanded ends of the frame are likewise connected together by an arched girt, C, D being a center bar, which connects the two girts together, which is provided with a proper clevis, to which the draft force is applied, and upon which may be secured a seat for the driver, if desired. These side bars of the frame are provided with kerfs cut diagonally through the same at the junction of two of their sides, as clearly shown in Fig. 4.

E represents the pulverizing-teeth, which are constructed of straight blades wedge-shaped in cross-section, as shown at *a* in Fig. 4, sharpened upon their lower edges, and are secured to the side bars of the frame by being inserted in said kerfs, their free ends projecting inwardly, being inclined toward each other and to the rear, as shown, in such a manner that in use these blades will have a straight but shearing cut upon the surface of the ground being operated upon.

The girt B is recessed, as shown, to receive the center bar, D, and is secured to the blocks B', which are secured to the forward end of the frame A, thus allowing of a greater space for the passage of the corn. The girt C is also recessed to receive the rear end of the bar D, as will be readily understood.

Upon the sides of the frame I adjustably secure the scraper-plates F by means of the bolts and slots shown in the drawings, such plates being for the purpose of leveling off the inequalities of the ground in advance of the teeth, and preventing any outward displacement thereof, as the ends of the teeth abut against said plates.

It will be observed that this device may also be advantageously employed as a cultivator for cultivating young corn. It straddles the row, the corn passing underneath the arched girts.

I attach importance to the manner of securing the teeth E to the frame, for this construction allows of the use of a tooth made from a single straight piece of metal, and being wedge-shaped all tendency toward accidental displacement is avoided, for any lateral strain will only the more securely bind them in place, as will be readily understood.

What I claim as my invention is—

In a pulverizer, and in combination with the frame A thereof, provided with kerfs formed diagonally through the same at the junction of two of its sides, the teeth F, wedge-shaped in cross-section and set in said kerfs, substantially as described.

ALONZO SKINNER.

Witnesses:
H. S. SPRAGUE,
CHARLES J. HUNT.